US011641395B2

(12) United States Patent
Cao (10) Patent No.: US 11,641,395 B2
(45) Date of Patent: May 2, 2023

(54) FAULT TOLERANT SYSTEMS AND METHODS INCORPORATING A MINIMUM CHECKPOINT INTERVAL (71) Applicant: Stratus Technologies Bermuda, Ltd., Hamilton (BM)

(72) Inventor: Lei Cao, Westford, MA (US)

(73) Assignee: STRATUS TECHNOLOGIES IRELAND LTD.

( * ) Notice: Subject to any disclaimer, the term of this patent is extended or adjusted under 35 U.S.C. 154(b) by 0 days.

(21) Appl. No.: 16/900,910

(22) Filed: Jun. 13, 2020

(65) Prior Publication Data
US 2021/0037092 A1 Feb. 4, 2021

Related U.S. Application Data (60) Provisional application No. 62/881,289, filed on Jul. 31, 2019.

(51) Int. Cl.
*G06F 15/16* (2006.01)
*G06F 9/54* (2006.01)
(Continued)

(52) U.S. Cl.
CPC .......... *H04L 67/1095* (2013.01); *G06F 9/466* (2013.01); *H04L 43/16* (2013.01); *G06Q 10/06315* (2013.01)

(58) Field of Classification Search
CPC ...... H04L 67/1095; H04L 43/16; G06F 9/466
(Continued)

(56) References Cited

U.S. PATENT DOCUMENTS 6,035,415 A * 3/2000 Fleming .............. G06F 11/2023
714/13
6,355,991 B1 3/2002 Goff et al.
(Continued)

FOREIGN PATENT DOCUMENTS

CA 2657882 A1 * 2/2008 .......... G06F 11/1687
WO WO-2008021636 A2 * 2/2008 .......... G06F 11/2038

OTHER PUBLICATIONS

Dong et al., "COLO: COarse-grain LOck-stepping Virtual Machine for Non-stop Service", SoCC'13, Oct. 1-3, 2013, Santa Clara, California, USA, ACM 978-1-4503-2428-1; 16 pages.
(Continued)

*Primary Examiner* — Hamza N Algibhah
(74) *Attorney, Agent, or Firm* — K&L Gates LLP (57) ABSTRACT

In part, disclosure relates to a method of regulating checkpointing in an active active fault tolerant system. The method includes receiving a request from a client through a network at a primary computer; copying, by the primary computer, the request from the client to a secondary computer; processing the request from the client, using the primary computer, to generate a primary computer result; processing the copy of the request from the client, using the secondary computer, to generate a secondary computer result; comparing the primary computer result and the secondary computer result to obtain a comparison metric; determining whether a minimum checkpoint interval has been met or exceeded; and if the minimum checkpoint interval has not been met or exceeded, delay initiating a checkpoint process from primary computer to secondary computer.

11 Claims, 5 Drawing Sheets

(51) Int. Cl.
*H04L 29/06* (2006.01)
*H04L 67/1095* (2022.01)
*H04L 43/16* (2022.01)
*G06F 9/46* (2006.01)
*G06Q 10/0631* (2023.01)

(58) Field of Classification Search
USPC .......................................................... 709/224
See application file for complete search history.

(56) References Cited

U.S. PATENT DOCUMENTS

| | | | |
|---|---|---|---|
| 6,633,996 B1 | 10/2003 | Suffin et al. | |
| 6,687,851 B1 | 2/2004 | Somers et al. | |
| 6,691,225 B1 | 2/2004 | Suffin | |
| 6,691,257 B1 | 2/2004 | Suffin | |
| 6,708,283 B1 | 3/2004 | Nevin et al. | |
| 6,718,474 B1 | 4/2004 | Somers et al. | |
| 6,766,413 B2 | 7/2004 | Newman | |
| 6,766,479 B2 | 7/2004 | Edwards | |
| 6,802,022 B1 | 10/2004 | Olson | |
| 6,813,721 B1 | 11/2004 | Tetreault et al. | |
| 6,842,823 B1 | 1/2005 | Olson | |
| 6,862,689 B2 | 3/2005 | Bergsten et al. | |
| 6,874,102 B2 | 3/2005 | Doody et al. | |
| 6,886,171 B2 | 4/2005 | MacLeod | |
| 6,928,583 B2 | 8/2005 | Griffin et al. | |
| 6,970,892 B2 | 11/2005 | Green et al. | |
| 6,971,043 B2 | 11/2005 | McLoughlin et al. | |
| 6,996,750 B2 | 2/2006 | Tetreault | |
| 7,065,672 B2 | 6/2006 | Long et al. | |
| 7,308,607 B2 * | 12/2007 | Reinhardt | G06F 9/3863 714/728 |
| 7,496,786 B2 | 2/2009 | Graham et al. | |
| 7,496,787 B2 | 2/2009 | Edwards et al. | |
| 7,669,073 B2 | 2/2010 | Graham et al. | |
| 7,904,906 B2 | 3/2011 | Puthukattukaran et al. | |
| 7,958,076 B2 | 6/2011 | Bergsten et al. | |
| 8,117,495 B2 | 2/2012 | Graham | |
| 8,161,311 B2 | 4/2012 | Wiebe | |
| 8,234,521 B2 | 7/2012 | Graham et al. | |
| 8,271,416 B2 | 9/2012 | Al-Biek et al. | |
| 8,312,318 B2 | 11/2012 | Graham et al. | |
| 8,381,012 B2 | 2/2013 | Wiebe | |
| 8,812,907 B1 | 8/2014 | Bissett et al. | |
| 9,251,002 B2 | 2/2016 | Manchek et al. | |
| 9,471,438 B1 * | 10/2016 | Jacques Da Silva | G06F 11/1438 |
| 9,588,844 B2 | 3/2017 | Bissett et al. | |
| 9,652,338 B2 | 5/2017 | Bissett et al. | |
| 9,652,568 B1 * | 5/2017 | Tzelnic | G06F 16/00 |
| 9,760,442 B2 | 9/2017 | Bissett et al. | |
| 10,216,598 B2 | 2/2019 | Haid et al. | |
| 10,360,117 B2 | 7/2019 | Haid et al. | |
| 2001/0042202 A1 | 11/2001 | Horrath et al. | |
| 2002/0016935 A1 | 2/2002 | Bergsten et al. | |
| 2002/0070717 A1 | 6/2002 | Pellegrino | |
| 2003/0046670 A1 | 3/2003 | Marlow | |
| 2003/0095366 A1 | 5/2003 | Pellegrino | |
| 2005/0138461 A1 * | 6/2005 | Allen | G06F 11/2071 714/E11.08 |
| 2005/0278567 A1 * | 12/2005 | Wolfe | G06F 11/187 714/E11.069 |
| 2006/0222125 A1 | 10/2006 | Edwards et al. | |
| 2006/0222126 A1 | 10/2006 | Edwards et al. | |
| 2006/0259815 A1 | 11/2006 | Graham et al. | |
| 2006/0274508 A1 | 12/2006 | LaRiviere et al. | |
| 2007/0011499 A1 | 1/2007 | Begsten et al. | |
| 2007/0028144 A1 | 2/2007 | Graham et al. | |
| 2007/0038891 A1 | 2/2007 | Graham | |
| 2007/0106873 A1 | 5/2007 | Lally et al. | |
| 2007/0174484 A1 | 7/2007 | Lussier et al. | |
| 2009/0249129 A1 | 10/2009 | Femia | |
| 2011/0167195 A1 * | 7/2011 | Scales | G06F 11/1407 718/1 |
| 2015/0205671 A1 * | 7/2015 | Bissett | G06F 11/1484 714/15 |
| 2015/0205672 A1 * | 7/2015 | Bissett | G06F 11/1438 714/18 |
| 2015/0205673 A1 * | 7/2015 | Bissett | G06F 11/1471 714/16 |
| 2015/0205688 A1 * | 7/2015 | Haid | G06F 11/2097 709/212 |
| 2015/0263983 A1 | 9/2015 | Brennan et al. | |
| 2016/0034362 A1 * | 2/2016 | Al-Wahabi | G06F 11/1407 714/4.1 |
| 2016/0378611 A1 * | 12/2016 | Ljubuncic | G06F 11/1451 714/19 |
| 2017/0068606 A1 * | 3/2017 | Vora | G06F 11/323 |
| 2017/0277153 A1 * | 9/2017 | Samii | G05B 19/0425 |
| 2017/0300347 A1 * | 10/2017 | Tian | G06F 9/45558 |
| 2017/0324609 A1 | 11/2017 | Hong et al. | |
| 2017/0364425 A1 * | 12/2017 | Haid | G06F 11/1407 |
| 2018/0046480 A1 * | 2/2018 | Dong | G06F 11/1687 |
| 2018/0143885 A1 | 5/2018 | Dong et al. | |
| 2019/0188080 A1 * | 6/2019 | Cape | G06F 11/3409 |
| 2019/0196912 A1 * | 6/2019 | Didehban | G06F 11/1407 |
| 2020/0050523 A1 | 2/2020 | Pawlowski et al. | |
| 2021/0034447 A1 | 2/2021 | Horvath et al. | |
| 2021/0034464 A1 | 2/2021 | Dailey et al. | |
| 2021/0034465 A1 | 2/2021 | Haid et al. | |
| 2021/0034483 A1 | 2/2021 | Haid | |
| 2021/0034523 A1 | 2/2021 | Dailey | |
| 2021/0037092 A1 | 2/2021 | Cao | |

OTHER PUBLICATIONS

Dong et al., "COLO: COarse-grain LOck-stepping Virtual Machine for Non-stop Service", https://www.linux-kvm.org/images/1/1d/Kvm-forum-2013-COLO.pdf; 24 pages.

* cited by examiner

FAULT TOLERANT SYSTEMS AND METHODS INCORPORATING A MINIMUM CHECKPOINT INTERVAL

RELATED APPLICATIONS

The application claims the benefit of priority to U.S. Provisional Application No. 62/881,289, filed on Jul. 31, 2019, and which is incorporated herein by reference in its entirety.

FIELD

The disclosure relates generally to the field of fault tolerant computing and more specifically to checkpointing in a fault tolerant server.

BACKGROUND

There are a variety of ways to achieve fault tolerant computing in a server system. As an example, it is possible to connect two (or more) computers, such that one computer, the primary computer (also referred to as machine or node) actively makes calculations or obtains data requested by a client while the secondary computer makes the same calculations as the primary computer to shadow the results of the primary computer. This form of fault tolerant computing, termed active-active fault tolerance, is performed in case the primary computer, or hardware or software component thereon, experiences some type of failure. In these systems, the information about the current state of the primary computer must be periodically saved to the secondary computer so that the primary and secondary computers are substantially synchronized and the secondary computer can substantially take over computation at the point in the calculations where the active primary computer experienced a failure.

The periodic transfer of data to maintain synchrony between the states of the primary and secondary computers is termed checkpointing. A checkpoint defines a point in time when the data is to be transferred from the primary to the secondary computer. A checkpoint controller, which is typically a software module, determines when a checkpoint is declared to occur. During a checkpoint, the processing on the primary computer is at some point paused, so that the final state of the primary machine and associated memory is not changed during the checkpoint interval and once the relevant data is transferred, both the primary and secondary computers are in the same state. When the transfer of information between the primary and secondary computers is complete, the checkpoint is complete, and the execution by the primary and secondary computers is resumed and continues to run the application until the next checkpoint, when the process repeats.

Checkpoints can be determined by the checkpoint controller either to occur by the passage of a fixed amount of elapsed time from the last checkpoint, or by the occurrence of some event, such as: the number pages of memory accessed (termed dirty pages); the occurrence of a network event (such as network acknowledgement output from the primary computer); or the occurrence of excessive buffering on the secondary computer (as compared to available memory) during the execution of the application. Elapsed time checkpointing is considered fixed checkpointing, while event based checkpointing is considered dynamic or variable-rate checkpointing.

In summary the process of checkpointing generally involves copying the operational state (both memory and processor state) of the primary computer to the secondary computer In this way, the two computers operate in a fault tolerant manner, with the secondary computer available if the primary computer fails or experiences a significant error. This must be done while minimizing the amount of time the primary and secondary computers are paused while the data is moved from the primary to secondary computer.

The present disclosure addresses these challenges.

SUMMARY

In an embodiment, a method of regulating checkpointing in an active-active fault tolerant system may include receiving a request from a client through a network at a primary computer; copying, by the primary computer, the request from the client to a secondary computer; processing the request from the client, using the primary computer, to generate a primary result; processing the copy of the request from the client, using the primary computer, to generate a primary computer result; processing the copy of the request from the client, using the secondary computer, to generate a secondary computer result; comparing the primary computer result and the secondary computer result to obtain a comparison metric; determining whether a minimum checkpoint interval has been met or exceeded; and if the minimum checkpoint interval has not been met or exceeded delay initiating a checkpoint process from primary computer to secondary computer.

One or more of the following features may be included. The method may include initiating a checkpoint process if the comparison metric indicates that primary computer and secondary computer are diverging or differing with regard to one or more comparable parameters. The method may include the minimum checkpoint interval ranges from about 30 ms to about 70 ms. The method may include the minimum checkpoint threshold time ranges from about 50 ms to about 100 ms. The method may include if the primary computer result and the secondary computer result diverge, holding the primary computer result until completion of a next checkpoint process.

One or more of the following features may be included. The method may include if the primary computer result and the secondary computer result match, sending the primary computer result to the client. The method may include creating a first thread, at the primary computer, for processing the request from the client. The method may include creating a second thread, at the secondary computer, for processing the copy of the request from the client. The method may include queuing network packets from first thread and second thread until next checkpoint. The method may include a request from the client which includes input/output (I/O request and/or a packet. The method may include minimum checkpoint interval ranges from about 20 ms to about 60 ms. The method may include minimum checkpoint interval ranges from about 60 ms to about 120 ms.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation.

BRIEF DESCRIPTION OF THE DRAWINGS

The structure and function of the disclosure can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

DETAILED DESCRIPTION

As indicated above, checkpointing is used in industry to save and copy the state of a primary computer to one or more secondary computers as part of a fault tolerant system such as an FT server. Generally, managing checkpoint processes in a fault tolerant system can be time consuming. Improving the efficiency of checkpointing processes would therefore be beneficial to the fault tolerant computer industry. In general, there are various technical problems that can arise from effectively having a high checkpointing rate due to various fault tolerant computing use cases such as high transactional volume databases implemented using a fault tolerant system.

In part, the disclosure describes various embodiments for which, instead of performing a checkpoint operation each time results are not similar, a minimum checkpoint time is specified. The use of such a minimum value can improve one or more operating parameters of the fault tolerant system. Specifically, it can increase efficiency of processing of network routed transactions and processes across all clients accessing the primary computer. Further, the systems and methods disclosed herein can minimize the effect of each checkpoint operation on overall system performance. Additional details are described in more detail here with regard to implementing such a minimum checkpoint value or threshold.

While using an active-active fault tolerant (FT) system, such as a server implementation with clients, various types of workloads can induce a system to frequently initiate checkpoint processes which causes a high level of system overhead and affects the efficiency of the FT system. The network traffic and processing induced by it can contribute to performance degradation in an active active FT system. The present disclosure applies to active-active fault tolerant (FT) systems that perform checkpointing operations to maintain fault tolerance when managing a plurality of client requests. In various embodiments, a FT system can include virtualization based active-active checkpointing systems. A FT system can include OS based (non-virtualized based) checkpointing systems.

An FT system includes a primary computer and a secondary computer in communication through interface hardware. The FT system can handle a plurality of client communications received in a short time frame. A client sends a client communication to the primary computer. In various embodiments, a client communication can be an input/output (I/O) request and/or a packet. In one embodiment, all I/O requests are network packets. The primary computer forwards the client communication to the secondary computer. Both the primary computer and the secondary computer process the client communication and produce a result. The result from the secondary computer is forwarded to the primary computer, so the primary computer can compare the results between the primary and secondary computer.

The primary computer in an FT system creates a network session/thread for each client communication and/or client request received by the FT system. Each client communication is forwarded to and processed by the secondary computer and the results from the secondary computer are verified by comparing results from the primary computer and the secondary computer for each network session. When processing a plurality of client communications, some network sessions fail and some network sessions succeed. As a result of primary and secondary computers running independently, this may cause the thread associated with that session to diverge between the primary and secondary computers. Typically, FT systems previously required that checkpoints be performed on all threads upon finding any divergence between the primary and secondary computers regardless of whether the divergence was in many or in one thread.

However, in the present disclosure instead of performing a checkpoint upon each divergence (lack of finding of acceptable level of similarity), the FT system pauses all network sessions that are diverging and allows non-diverging sessions to continue until a minimum checkpoint interval has been reached. The FT system effectively pauses the diverging network sessions by preventing the network packets belonging to those sessions from being transmitted. The network packets from the diverging network session are queued up waiting for the next checkpoint, at which point they are flushed out. While the network session is paused, the thread running the network session is not paused and continues to run and can generate more outgoing network packets, which will be queued up until the next checkpoint. This implementation balances increasing potential processing time of successful network sessions with the overhead of performing a checkpoint operation. In various embodiments, a checkpoint engine within the primary computer in the FT system uses a minimum checkpoint interval to facilitate optimizing the checkpoint process. A minimum checkpoint interval is the minimum time that must pass before another checkpoint operation can be initiated.

An FT system diverges when there is a mismatch of a result between the primary and secondary nodes within the FT system. However, synchronizing or lockstepping of the primary and secondary nodes is preserved if the divergent or mismatched results are not transmitted to the client. In response to a client request/communication, a computing system may process the request/communication by generating a thread that manages the request/communication from the client. The processing of the thread typically generates a responsive output. In the present disclosure, the FT system holds the responsive output from a thread by queuing network packets, which may include the responsive output, belonging to that thread until after the next checkpoint. In various embodiments, a thread managing one or more client communications is a network session thread. In one embodiment, a network session thread is defined by source IP address and source port and destination IP address and destination port.

An example implementation is a DVD store using a FT system for serving database requests. In this instance, the FT system handles inputs and outputs (I/Os) coming from various clients in the order received. The FT system potentially handles hundreds, if not thousands, of client requests in a short time frame, which increases the possibility of divergence in the FT system happening simultaneously or near simultaneously. The FT system handles the client data by spawning threads to handle each client's requests. As each request can be scheduled differently on each of the two nodes within the FT system, each database on each node could diverge. In one embodiment, setting a minimum checkpoint interval resulted in an improvement in checkpointing performance by about 50% in an active active fault tolerant system.

In various embodiments, depending on a work load and circumstances of implementation, a minimum checkpoint interval can be increased or decreased to suit a specific use. In one embodiment, the minimum checkpoint interval ranges from about 20 ms to about 50 ms. In one embodiment, the minimum checkpoint interval ranges from about 50 ms to about 120 ms. In one embodiment, the minimum checkpoint interval ranges from about 20 ms to 50 ms. In one embodiment, the minimum checkpoint interval ranges from about 60 ms to 120 ms.

In various embodiments, the FT system includes a model for determining a best minimum checkpoint threshold for a given implementation. In some embodiments, various minimum checkpoint threshold values are tested to determine an optimal minimum checkpoint threshold value. This may be performed heuristically by running different simulations under various conditions and for different use cases and tracking which minimum checkpoint threshold results in performance gains for each of the foregoing. Those results can be used to establish different ranges for the minimum checkpoint threshold on a per use case/per implementation basis.

In various embodiments, the FT system enforces a minimum checkpoint interval. Instead of triggering a checkpoint immediately when a network data mismatch is detected, the FT system checks to see if the elapsed time since the last checkpoint is above the minimum checkpoint interval. If the elapsed time since the last check point is above the minimum checkpoint interval, the FT system triggers a checkpoint operation immediately. If the elapsed time since the last checkpoint is below the minimum checkpoint interval, the FT system delays the checkpoint until the enough time has elapsed.

In one embodiment, network sessions that would normally trigger a checkpoint operation, are paused, which means the network packets belonging to the network session are queued and not transmitted until after the next checkpoint operation. When the elapsed time exceeds the minimum checkpoint interval and a checkpoint operation has been requested and/or triggered, the checkpoint process is initiated and all queued network packets of paused network sessions are transmitted.

In various embodiments, a checkpoint is triggered when the FT system has diverged. A divergence is when there is a mismatch of output network data from the two nodes within the FT system. However, if the mismatched network data is never transmitted, the lockstepping of the two nodes in the FT system is preserved. By delaying the checkpoint and queuing the mismatched network packets, performance of diverged threads are sacrificed for improved overall performance.

Figure 1:
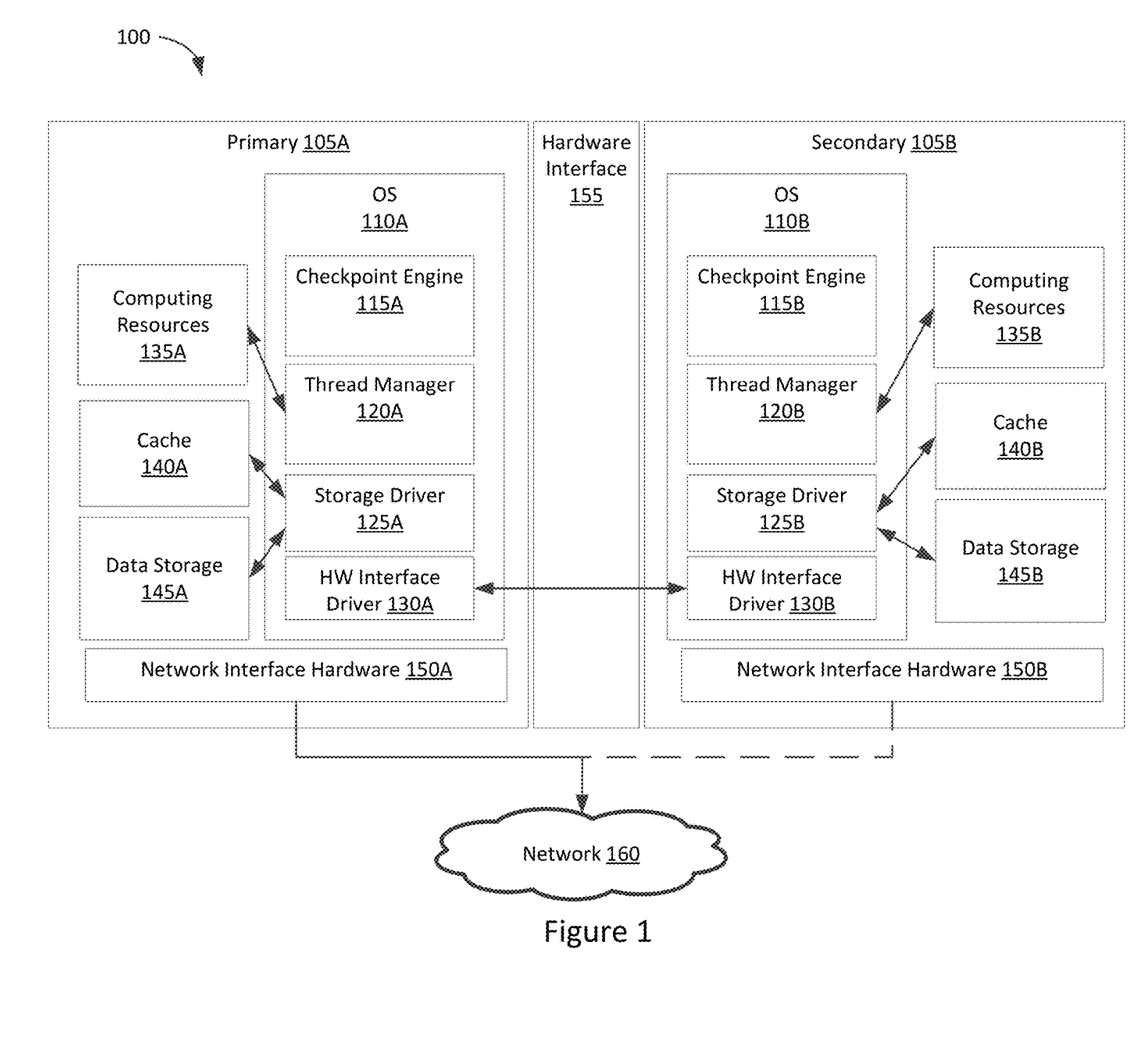
FIG. 1 is an embodiment of an active active fault tolerant system of the present disclosure.

FIG. 1 is an embodiment of a fault tolerant (FT) system. The FT system 100 includes a primary computer or node 105A, a secondary computer or node 105B, and hardware interface 155. A given node may be a server or other computing device running various applications to generate outputs in response to client requests. Primary computer 105A includes operating system (OS) 110A, computing resources 135A, memory145A, and network interface hardware 150A. Similar to primary computer 105A, secondary computer105B includes operating system (OS) 110B, computing resources 135B, memory 145B, and network interface hardware 150B. Each of the OS 110A and 110B include a checkpoint engine 115A, 115B, a thread manager 120A, 120B, and a hardware interface driver 130A, 130B that allows the primary and secondary computers to communicate with one another through the hardware interface 155.

Both computer 105A and computer105B have connections to network 160 by which the FT system 100 communicates with clients, however, the network interface hardware 150B is not utilized by computer 105B unless a failover event occurs in which primary computer 105A fails and secondary computer 105B must take over communications with the clients. Client communications received by primary computer 105A are also routed to secondary computer 105B through hardware interface 155 and results sent by obtained by secondary computer 105B are returned to primary computer 105A again using the hardware interface 155.

Thread manager 120A and thread manager 120B each creates a thread to manage each incoming client communication. In various embodiments, a client communication is a request or an input/output (I/O). Each thread manager allocates computing resources 135A, 135B, as needed. In one embodiment, storage drivers 125A and 125B manages communication with respective caches 140A and 140B and data storage 145A and 145 on the respective nodes 105A and 105B. Hardware interface driver 130A and hardware interface driver 130B manages communication between node 105A and node 105B across the hardware interface 155. Once the secondary computer services the client request, the results are sent to the primary computer 105A through the hardware interface 155 for additional processing.

The checkpoint engines 115A and 115B handle the timing and control of checkpoint operations between the primary computer 105A and the secondary computer 105B. The checkpoint engines 115A and 115B enforce the minimum checkpoint threshold, set at the FT system 100 level. The minimum checkpoint threshold is the minimum time between allowed between checkpoint operations. The FT system 100 does not perform a checkpoint operation until the minimum checkpoint threshold has passed since the last checkpoint operation, even when other systems within the FT system 100 indicate a checkpoint operation should be initiated. In various embodiments, the minimum checkpoint threshold is configurable based on FT system 100 implementation and/or usage. In various embodiments, the minimum checkpoint threshold is configurable based on current and/or potential future usage of the FT system 100.

Thread manager 120A and thread manager 120B creates a thread to manage each incoming client communications. In various embodiments, a client communication is a request for information. In various embodiments, a client communication is an input/output (I/O) from a client. Each thread allocates computing resources 135A, 135B, as needed, and utilizes storage drivers 125A, 125B to interface with each respective cache 140A, 140B and data storage 145A, 145B on each respective node105A, 105B.

Upon receiving results from node 105A and node 105B, the thread manager 120A compares the results to determine their similarity. If the results are similar, the thread manager forwards the results from node 105A to the client. If the results are not similar, the thread manager 120A requests that the checkpoint engine 115A initiates a checkpoint operation. The thread manager 120A then holds the results until the next checkpoint operation has been completed. As described above, if the minimum checkpoint threshold has been met, the checkpoint engine 115A initiates a checkpoint operation. If the minimum checkpoint threshold has not been met, the checkpoint engine 115A waits until the minimum checkpoint threshold has been met and then initiates a checkpoint operation.

Figure 2:
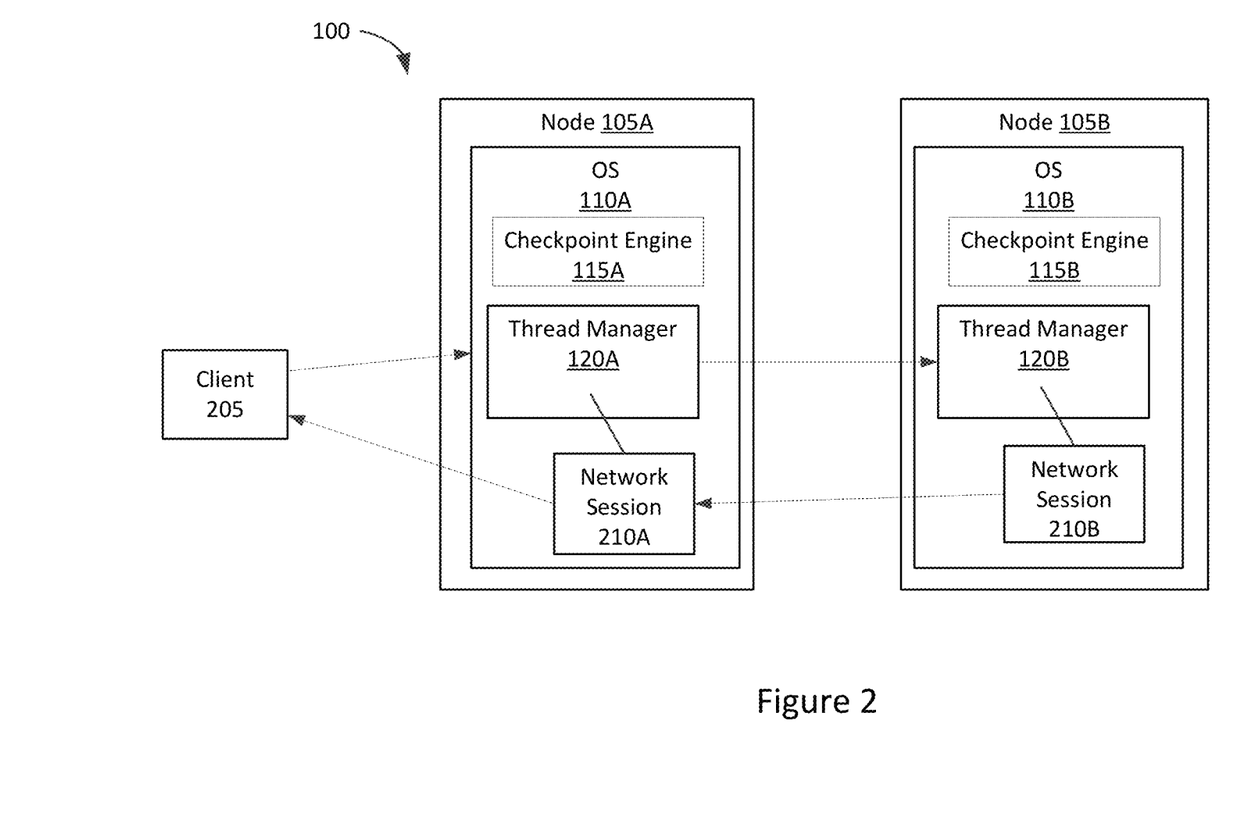
FIG. 2 is a simplified illustration of the embodiment shown in FIG. 1 showing the steps of a single thread, in accordance with the present disclosure.

FIG. 2 is a simplified illustration of the embodiment shown in FIG. 1 showing a FT system 100 managing a client communication. In this embodiment, client 205 is sending a client communication to thread manager 120A in OS 110A of node 105A. The thread manager 120A forwards the client communication to thread manager 120B in OS 110B of node 105B. Thread manager 120A creates a network session 210A, which in this case is a thread, to handle the client communication. Both network session 210A and network session 210B process the client communication at their respective nodes 105A, 105B and obtain a result. Upon obtaining a result at network session 210A, the network session 210A waits to receive results from network session 210B.

When OS 110B receives the forwarded client communication, the thread manager 120B creates network session 210B, which in this case is a thread, to handle the client communication. When a result from network session 210B obtained, network session 210B forwards the result to network session 210A and then ends. Upon receiving results from both network session 210A and network session 210B, network session 210A compares both results to determine similarity between the results. If the results are similar, network session 210A returns the results created by network session 210A to client 205. If the results are not similar, network session 210A notifies the checkpoint engine 115A that a checkpoint operation should be performed and holds the results until the next checkpoint operation completes. When the results are forwarded to client 205, the network session 210A completes. This checkpointing operation can be regulated using a minimum checkpoint interval as disclosed herein.

Figure 3:
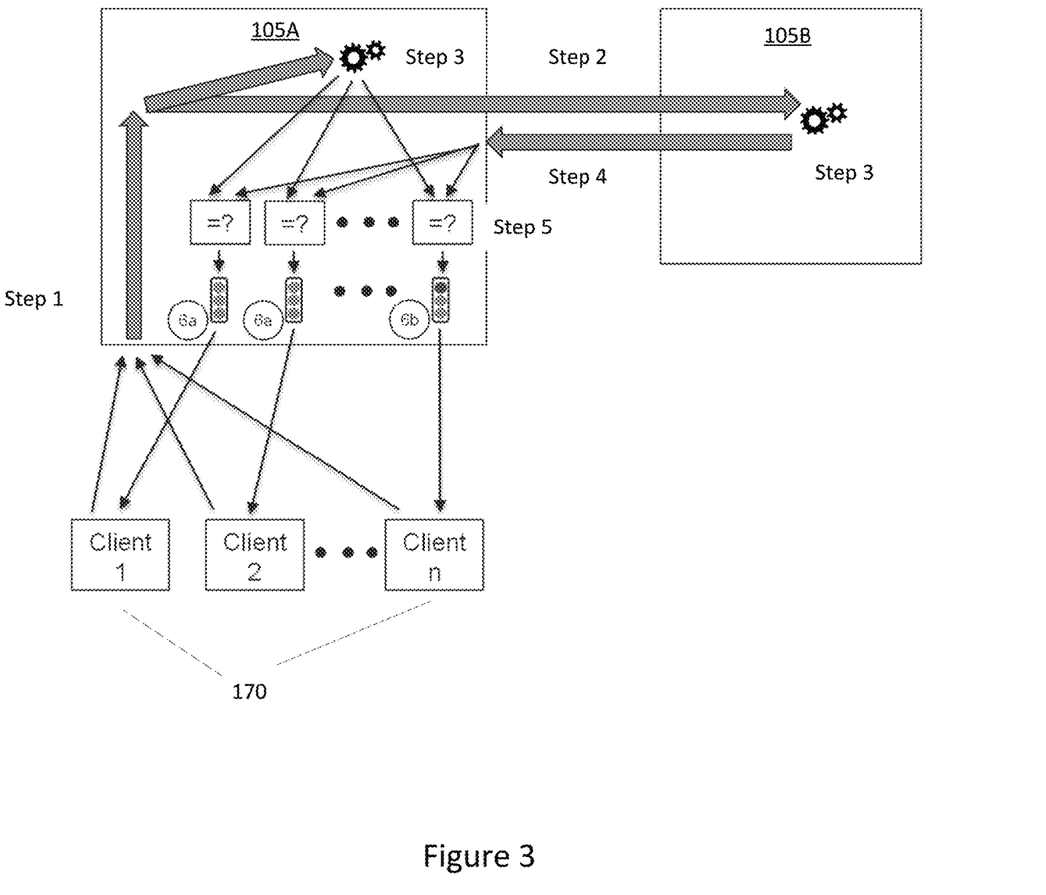
FIG. 3 is a schematic diagram of a fault tolerant checkpointing system handling multiple threads, in accordance with the present disclosure.

The operation of the FT system 100 according to the disclosure is depicted in FIG. 3. As in FIG. 3, the FT system 100 has a multithread primary computer 105A and a multithread secondary computer 105B responding to requests from multiple clients (generally 170) over the network. Clients 170 make requests (Step 1) through the network 160 which is received by the primary computer 105A. The primary computer 105A utilizes the thread manager to generate a network session, a thread, for each request from a client 170. The thread manager of the primary computer 105 A forwards (Step 2) each request to the thread manager of the secondary computer 105B. The thread manager of the secondary computer 105B forms its own network session. Both the primary computer 105A and the secondary computer 105B process each request (Step 3) and generate a response for each request.

The secondary computer 105B returns its response (Step 4) to primary computer 105A through its network session and then terminates the network session. The thread manager 120A as part of a network hardware driver of the primary computer 105A compares (Step 5) each response of the primary computer 105A with the response generated by the secondary computer 105B for each active thread.

If each the responses from the primary computer 105A and the secondary computer 105B for each of the requests are similar, using one or more comparison techniques applicable in an active active system, all the responses are immediately returned by their respective threads of the primary computer to their respective client (Step 6a). If a response from the primary computer 105A and the secondary computer 105B are not similar (Step 6b) for a given thread, all other responses, for the other threads that are equal, are sent to the respective clients and only that divergent response from the primary computer 105A is held by the thread manager 120A of the primary computer 105A. However, unlike the prior art, a checkpoint is not initiated until a minimum time interval has elapsed since the last checkpoint. Once the minimum time interval elapses, is met, or exceeded a checkpoint is initiated. It should be noted that more that one thread may have diverged and been blocked/paused by the time the minimum interval has elapsed. All the blocked/paused responses are released only after a checkpoint has been called and completed. In various embodiments, the network session is persistent until the client explicitly closes the connection.

The primary computer checkpoint engine 115A enforces the minimum checkpoint value that is set at the FT system 100 level. The minimum checkpoint threshold is the minimum time allowed between checkpoint operations and the FT system 100 does not perform a checkpoint operation until the minimum checkpoint threshold has passed even when other systems within the FT system 100 indicate a checkpoint operation should be initiated. In one embodiment, buffers filling up may indicate a checkpoint is required, this can be ignored in some embodiments.

In this embodiment, a miscompared response does not result in a checkpoint unless a minimum time interval has expired. Thus, even with a miscompare on one or multiple threads, processing continues on other active threads. The other active threads continue to return responses to clients until the minimum time interval has expired. In this embodiment, checkpoints are less frequent and the system is spending more of its execution time performing useful processing at the expense of some responses being delayed. In one embodiment, only the network triggered checkpoint can be delayed.

Figure 4:
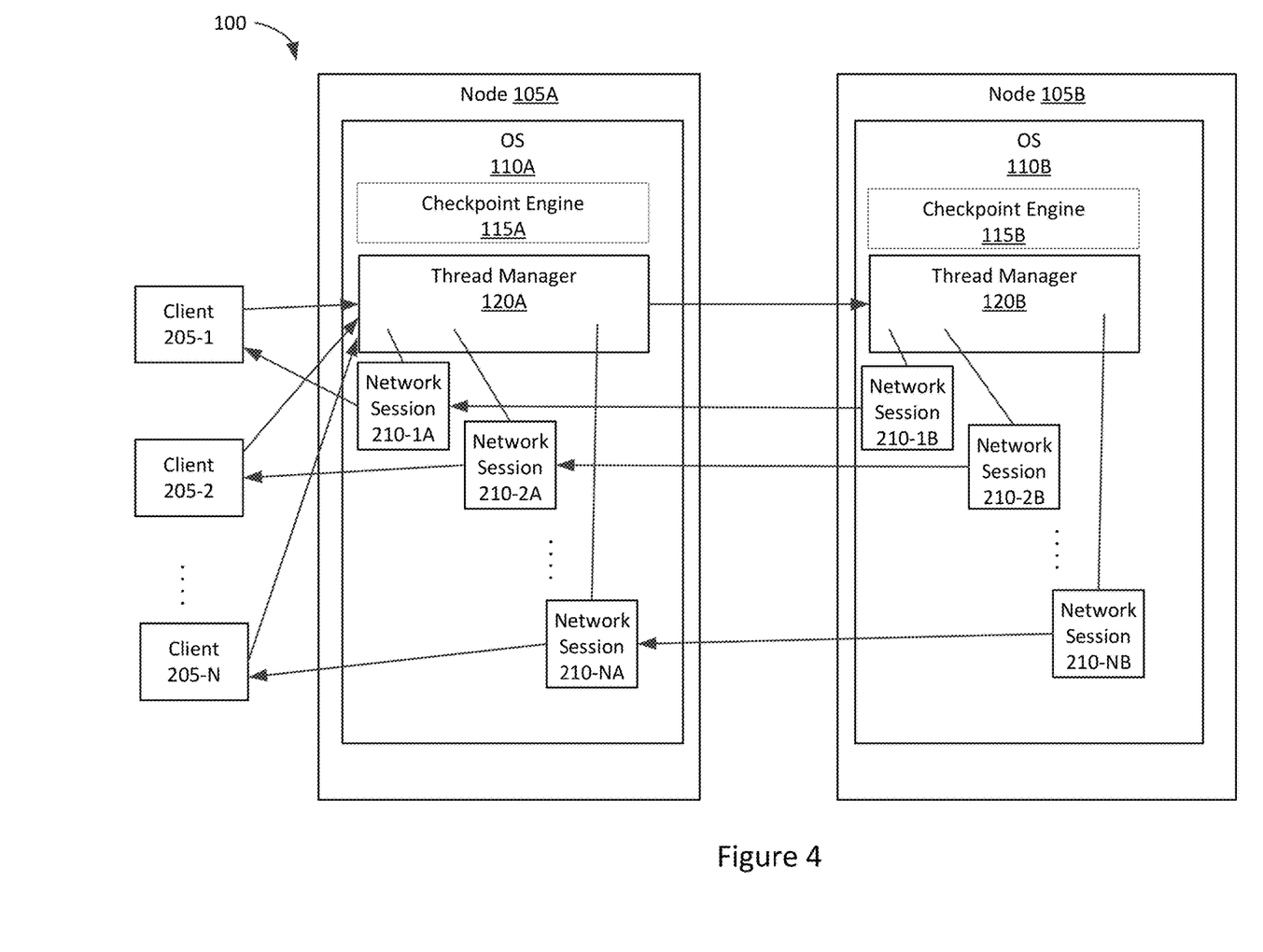
FIG. 4 is an alternate schematic diagram of a fault tolerant checkpointing system handling multiple threads as performed by the present disclosure.
Figure 5:
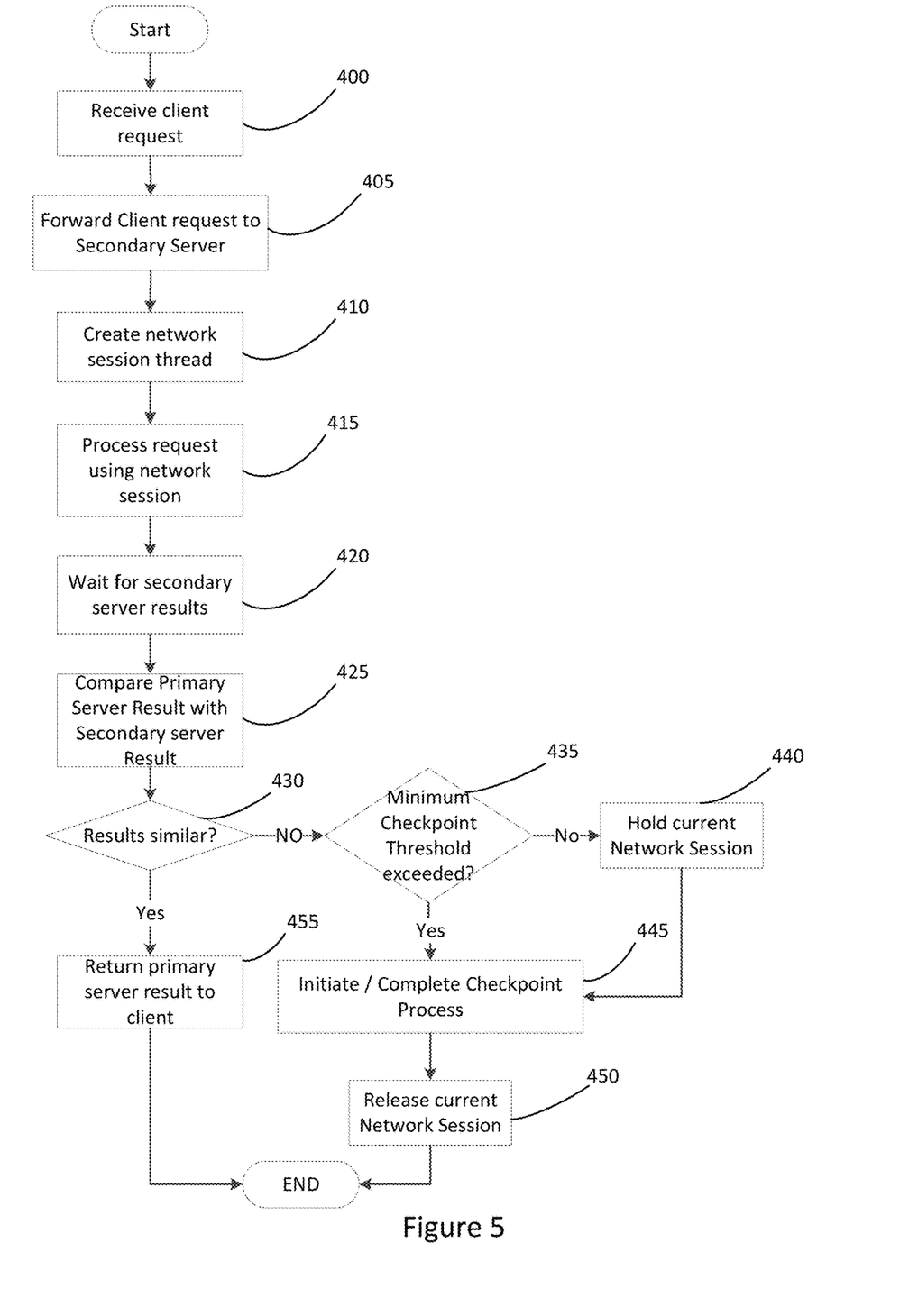
FIG. 5 is a simplified flowchart of a method of managing a checkpoint system using a minimum time interval, in accordance with the present disclosure.

FIG. 4 is an alternate simplified illustration of the embodiment shown in FIG. 1 showing a FT system 100 managing multiple client communications from multiple clients. In this embodiment, multiple clients (205-1 . . . 205-N, 205 Generally) are sending client communications to node 105A. Each client 205 initially communicates with the thread manager 120A, which forwards each respective client communication to thread manager 120B and creates network session (210-1A . . . 210-NA, 210-A Generally) associated with each client 205 sending a client communication. Similarly, thread manager 120B creates network sessions (210-1B . . . 210NB, 210-B generally) for each client communication received. In this embodiment, similar to the embodiment shown in FIG. 2, each network session 210-A handles the client communication and creates an associated result.

Each network session 210-B handles the client communication, creates an associated result, and forwards the associated result to the respect network session 210-A. Each respective network session 210-A compares its own result with the received result from corresponding network session 210-B to determine similarity between results. If there is similarity between results, the results from the respective network session 210-A is returned to the respective client 205. If the results are not similar, the network session 210-A holds the result and sends a request for checkpoint to the checkpoint engine 115A. If the time since the last checkpoint operation exceeds the minimum checkpoint threshold, checkpoint engine 115A initiates a checkpoint operation. If the time since the last checkpoint operation does not exceed the minimum checkpoint threshold, the checkpoint engine 115A waits to initiate a checkpoint operation until the threshold has been exceeded.

In the embodiment shown by FIG. 3 one or more network sessions 210-A can be currently holding results while waiting for the minimum checkpoint threshold to elapse. Instead of performing a checkpoint operation each time results are not similar, enforcing a minimum checkpoint time increases efficiency of processing client communications across all clients and minimizes the effect of each checkpoint operation on total FT system 100 performance.

FIG. 4 shows a flowchart of a method of checkpoint while managing multiple clients in a FT system as shown in FIG. 1, in accordance with an embodiment of the disclosure. The thread manager 120A in OS 110A on node 105A receives a client request/communication from a client (Step 400) and forwards the client communication to node 105B (Step 405). Thread manager 120A creates a network session thread to handle the client request/communication from the client (Step 410). The network session processes the client request/communication (Step 415). Upon obtaining a result, the network session wait for a result from the node 105B (Step 420).

In one embodiment, the network session compares the results from node 105A with the results from node 105B (step 425) and determines whether the results were similar (Step 430). If the results are similar, the network session on node 105A returns the results to the client (Step 455). If the results are not similar, the network session requests that the checkpoint engine 115A initiate a checkpoint operation. The checkpoint engine 115A determines if the minimum checkpoint threshold has been exceeded (Step 435). If the minimum checkpoint threshold has been exceeded, the checkpoint engine 115A initiates a checkpoint operation (Step 445). Upon completion of a checkpoint operation, each network session release any results that were held (Step 450). If the minimum checkpoint threshold has not been exceeded, the network session holds the results until the next checkpoint operation has been completed. In one embodiment, a network session is persistent until as in TCP case, client explicitly closes the connection.

General and Specific Computer-Based Implementations and Embodiments

Unless specifically stated otherwise as apparent from the following discussion, it is appreciated that throughout the description, discussions utilizing terms such as "processing" or "computing" or "calculating" or "delaying" or "comparing", "generating" or "determining" or "forwarding or "deferring" "committing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems is apparent from the description above. In addition, the disclosure is not described with reference to any particular programming language, and various embodiments may thus be implemented using a variety of programming languages.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The examples presented herein are intended to illustrate potential and specific implementations of the disclosure. The examples are intended primarily for purposes of illustration of the disclosure for those skilled in the art. No particular aspect or aspects of the examples are necessarily intended to limit the scope of the disclosure.

The figures and descriptions of the disclosure have been simplified to illustrate elements that are relevant for a clear understanding of the disclosure, while eliminating, for purposes of clarity, other elements. Those of ordinary skill in the art may recognize, however, that these sorts of focused discussions would not facilitate a better understanding of the disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the disclosure, a single component may be replaced by multiple components, and multiple components may be replaced by a single component, to perform a given function or functions. Except where such substitution would not be operative to practice embodiments of the disclosure, such substitution is within the scope of the disclosure. Any of the servers or nodes, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the disclosure. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The disclosure may be embodied in other specific forms without departing from the spirit or essential characteristics thereof. The foregoing embodiments are therefore to be considered in all respects illustrative rather than limiting on the disclosure described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

What is claimed is:

1. A method of regulating checkpointing in an active active fault tolerant system, the method comprising:
   receiving a request from a client through a network at a primary computer of the active active fault tolerant system;
   copying, by the primary computer, the request from the client to a secondary computer of the active active fault tolerant system;
   processing the request from the client, using the primary computer, to generate a primary computer result;

processing the copy of the request from the client, using the secondary computer, to generate a secondary computer result;

comparing the primary computer result and the secondary computer result to obtain a comparison metric;

determining a minimum checkpoint interval by running one or more simulations under various conditions and for different use cases and tracking which minimum checkpoint threshold results in performance gains for each of the foregoing;

determining whether the minimum checkpoint interval has been met or exceeded; and if the minimum checkpoint interval has not been met or exceeded, delay initiating a checkpoint process from primary computer to secondary computer, wherein checkpoint processes are performed to maintain fault tolerance when managing a plurality of client requests.

2. The method of claim 1 further comprising initiating a checkpoint process if the comparison metric indicates that primary computer and secondary computer are diverging or differing with regard to one or more comparable parameters.

3. The method of claim 1, wherein the minimum checkpoint interval ranges from about 30 ms to about 70 ms.

4. The method of claim 1, wherein the minimum checkpoint threshold time ranges from about 50 ms to about 100 ms.

5. The method of claim 1, wherein if the primary computer result and the secondary computer result diverge, holding the primary computer result until completion of a next checkpoint process.

6. The method of claim 1, wherein if the primary computer result and the secondary computer result match, sending the primary computer result to the client.

7. The method of claim 1, further comprising:
creating a first thread, at the primary computer, for processing the request from the client;
creating a second thread, at the secondary computer, for processing the copy of the request from the client; and
queuing network packets from first thread and second thread until next checkpoint.

8. The method of claim 1, wherein request from client comprises input/output (I/O) request and/or a packet.

9. The method of claim 1, wherein the minimum checkpoint interval ranges from about 20 ms to about 60 ms.

10. The method of claim 1, wherein the minimum checkpoint threshold time ranges from about 60 ms to about 120 ms.

11. The method of claim 1 further comprising queuing mismatched network packets while delaying initiating a checkpoint process to improve overall active active fault tolerant system performance.

* * * * *